United States Patent

Saam

[15] 3,686,356

[45] Aug. 22, 1972

[54] METHOD OF BLENDING POLYORGANOSILOXANE AND ORGANIC VINYLIC THERMOPLASTICS AND PRODUCTS THEREOF

[72] Inventor: John C. Saam, Midland, Mich.

[73] Assignee: Dow Corning Corporation, Midland, Mich.

[22] Filed: Aug. 25, 1970

[21] Appl. No.: 66,895

Related U.S. Application Data

[63] Continuation-in-part of Ser. No. 805,844, March 10, 1969.

[52] U.S. Cl. ................................. 260/825, 260/827
[51] Int. Cl. ................................................ C08g 47/10
[58] Field of Search ........................... 260/825, 827

[56] References Cited

UNITED STATES PATENTS

| | | | |
|---|---|---|---|
| 3,576,904 | 4/1971 | Saam et al. | 260/825 |
| 3,051,684 | 8/1962 | Morton et al. | 260/827 |
| 3,070,573 | 12/1962 | Beck | 260/827 |
| 3,436,252 | 4/1969 | Neuroth | 260/827 |
| 3,555,109 | 1/1971 | Getson | 260/827 |
| 3,532,729 | 10/1970 | Cekada et al. | 260/827 |
| 3,573,334 | 3/1971 | Wheeler | 260/827 |
| 3,483,270 | 12/1969 | Bostick | 260/827 |

FOREIGN PATENTS OR APPLICATIONS

| | | | |
|---|---|---|---|
| 1,134,834 | 8/1962 | Germany | 260/827 |
| 1,915,789 | 10/1969 | Germany | 260/827 |

*Primary Examiner*—Samuel H. Blech
*Attorney*—Robert F. Fleming, Jr., Laurence R. Hobey, Harry D. Dingman and Roger H. Borrousch

[57] ABSTRACT

A method of blending organic vinylic thermoplastics and polyorganosiloxanes by combining with a copolymer having polyorganosiloxane segments and organic vinylic polymer segments provides a homogeneous dispersion. This gives improved properties of the organic vinylic thermoplastic, such as tensile strength, impact strength, processability, and flow properties.

7 Claims, No Drawings

METHOD OF BLENDING POLYORGANOSILOXANE AND ORGANIC VINYLIC THERMOPLASTICS AND PRODUCTS THEREOF

This application is a continuation-in-part of application, Ser. No. 805,844, filed Mar. 10, 1969.

This invention relates to a method of blending organic vinylic thermoplastics and polyorganosiloxanes and products thereof.

Organic vinylic thermoplastics have proven to be exceptionally useful materials in view of the large volume produced every year. Their increasing usefulness is a direct result of technical advances which modify their properties. One such technical advance was the discovery that polyorganosiloxanes could be incorporated into thermoplastics to improve their properties. The improvement of any particular property, however, was temporary at best, since the polyorganosiloxane exuded from the thermoplastic and any advantageous result from the mixture was soon lost. This would be anticipated since the thermoplastics and polyorganosiloxanes are incompatible. Thus, methods of obtaining such mixtures were sought. One such method is described by Dietz in U.S. Pat. No. 3,121,069. Dietz describes a mechanical mixture of a thermoplastic high polymer where its molecular weight exceeds 5,000,000 and is cross-linked and a polyorganosiloxane where the molecular weight exceeds 150,000. Dietz describes a homogeneous mechnical mixture but is limited to certain molecular weight ranges and is also limited to the process of mixing these limited species. Further, Dietz must cross-link his thermoplastics in order to achieve the homogeneous mechanical mixture. Thermoplastics, however, are more often than not, used in the uncross-linked state. Dietz achieved the goal of making a homogeneous mixture of a thermoplastic and a polyorganosiloxane without the problem of exudation, but he is narrowly limited to mixable materials and the method of mixing. A method of making homogeneous blends of polyethylene and organopolysiloxanes is to use silica or other filler as a blending aid. This method is described by Safford in U.S. Pat. No. 2,888,419. Safford's method thus requires the presence of a filler which therefore limits him to a polyethylene filled system. A method of adding organosiloxane to a polyvinyl plastic composition is described by Reischl et al. in U.S. Pat. No. 3,332,900 in which Reischl et al. form an addition product between an organosiloxane and polyisocyanate.

It is therefore an object of the present invention to provide a method for blending organic vinylic thermoplastics and polyorganosiloxanes where said method is not narrowly limited and substantial control of the properties is realized. This and other objects will become apparent from the following detailed description of the present invention.

This invention relates to a method of homogeneously blending a polyorganosiloxane in an organic vinylic thermoplastic comprising combining with the organic vinylic thermoplastic and polyorganosiloxane, a copolymer in an amount of from 0.0001 to 50 inclusive weight percent based on the weight of the combined weight of the polyorganosiloxane and the organic vinylic thermoplastic, said polyorganosiloxane being essentially a polymer of diorganosiloxane units linked by silicon-oxygen-silicon bonds wherein the organic radicals are selected from the group consisting of alkyl, halogenated alkyl, aryl, halogenated aryl and alkenyl radicals where each organic radical has from one to 18 inclusive carbon atoms, said polyorganosiloxane being terminated by a radical selected from the group consisting of triorganosiloxy units and hydroxyl radicals, said polyorganosiloxane being present in an amount of from 0.001 to 50 inclusive weight percent based on the combined weight of the organic vinylic thermoplastic and the polyorganosiloxane, said copolymer consists essentially of at least one polyorganosiloxane segment and at least one organic vinylic polymer segment wherein the polyorganosiloxane segment is essentially the same molecular composition as the polyorganosiloxane and the organic vinylic polymer segment is essentially the same molecular composition as the organic vinylic thermoplastic, said copolymer having from 5 to 95 inclusive weight percent organic vinylic polymer segment and said organic vinylic thermoplastic being present in an amount of at least 40 weight percent based on the total weight of the composition.

The organic vinylic thermoplastics suitable for the present invention are of a well known class in the art. These thermoplastics are derived from polymerizable vinyl containing organic monomers. Such vinyl containing organic monomers include the styrene class, such as styrene, alpha-methylstyrene, vinyltoluene, 4-bromostyrene, 4-chloro-3-fluorostyrene, 2-chlorostyrene, 2,5-dichlorostyrene, 2,5-difluorostyrene, 2,4-dimethylstyrene, 4-ethoxystyrene, 4-hexyldecylstyrene, 3-hydroxymethylstyrene, 4-iodostyrene, 4-isopentoxystyrene, 4-nonadecylstyrene, and the like. Other vinyl containing organic monomers include ethylene, propylene, cyclohexene, divinylbenzene, indene, hexadecene, tetrafluoroethylene, vinylchloride, trifluorochloroethylene, allylchloride, vinylidene chloride, vinylidene fluoride, diethloroethylene, chlorocyclohexene, crotonaldehyde, acrylic aldehyde, cinnamic aldehyde, allyl alcohol, cyclohexenol, 4-methylpenten-3-ol-1, cinnamic alcohol, penten-4-ol-2, acrylic acid, methacrylic acid, crotonic acid, vinyl acetic acid, cinnamic acid, maleic acid, allylethyl ether, methyl acrylate, methyl methacrylate, vinylacetate, allylacetate, crotonamide, acrylamide, cinnamamide, acrylonitrile, methacrylonitrile, cinnamonitrile, vinyldimethylamine, vinylmethyl sulfide, vinyl methyl ether, methylvinyl ketone, allyl acetone, perfluorovinyl methyl ether, allylisocyanate, ethylacrylate, 2-ethyl-hexylacrylate, n-butylacrylate, methyl-alpha-chloroacrylate, hydroxyethylacrylate, dihydroperfluorobutylacrylate, propylacrylate, isopropylacrylate, calcium acrylate, sodium acrylate, cyclohexylacrylate, dodecylacrylate, isobornylacrylate, hexyldecylacrylate, tetradecylacrylate, dimethacrylate, 2-n-tert-butylaminoethylmethacrylate, 2-butylmethacrylate, glycidylmethacrylate, 2-chloroethylmethacrylate, 3,3-dimethylbutylmethacrylate, 2-ethylhexylmethacrylate, 2-methoxyethylmethacrylate, pentylmethacrylate, ethylmethacrylate, n-butylmethacrylate, isobutylmethacrylate, isopropylmethacrylate, propylmethacrylate, allylbenzoate, vinylbutyrate, vinylstearate, vinylbenzoate, dialkyl fumarates, dialkylmaleates, vinylidene bromide, vinylnaphthylene and vinyl pyridine. The organic vinylic thermoplastics can be homopolymers of organic vinylic monomers such as described in the above list or copolymers of the various organic monomers described in the above list, prepared by methods which are well known in the art.

The polyorganosiloxane in the present invention can be any of a number of well known polymeric siloxanes. These polyorganosiloxanes consist essentially of diorganosiloxane units linked together through silicon-oxygen-silicon bonds. Other siloxane units which can be present include triorganosiloxy units, monoorganosiloxane units and $SiO_2$ units. These other siloxane units are present in small amounts, such as up to about two mole percent. The amount of monoorganosiloxane units and $SiO_2$ units should not be present in those amounts which cause the polyorganosiloxane to be cross-linked in such amounts that the polyorganosiloxane is no longer blendable.

The organic radicals of the polyorganosiloxane can include alkyl radicals, halogenated alkyl radicals, aryl radicals, halogenated aryl radicals and alkenyl radicals. Each organic radical contains from one to 18 inclusive carbon atoms. Illustrative of the organic radicals are alkyl radicals such as methyl, ethyl, propyl, isopropyl, butyl, pentyl, isopentyl, neopentyl, hexyl, octyl, dodecyl, octadecyl, 3-methylheptyl, tertiary butyl, 2,2-diethylpentyl, cyclobutyl, cyclopentyl, cyclohexyl, cycloheptyl, propylcyclohexyl, 2,4-dimethylcyclopentyl, bicyclo[3.1.0]hexyl, spiro[4.5]decyl, and decahydronaphthyl; halogenated alkyl radicals such as chloromethyl, 3-chloropropyl, bromooctadecyl, 3,3,3-trichloropropyl, chlorosiopropyl, bromocyclohexyl, chlorocyclopentyl, fluorocyclohexyl, and 2(perfluoroalkyl)ethyl radicals in which the perfluoroalkyl, perfluoroisobutyl or perfluorohexadecyl; aryl radicals such as phenyl, tolyl, xylyl, 3-ethylphenyl, xenyl, naphthyl, anthracyl, pentacenyl, 3,4-methylethylphenyl, 9,9'-bifluoryl, 4-m-terphenyl, 2-phenyloctyl, 3-methyl-2-(4-isopropylphenyl)heptyl, benzyl, 2-ethyltolyl, 2-ethyl-p-cymyl, diphenylmethyl, 4,5-diphenylpentyl, 2-phenylethyl and 2-phenylpropyl; halogenated aryl radicals such as 2,4-dichlorophenyl, dibromoxenyl, alpha,alpha,alpha-trifluorotolyl, iodonaphthyl, tetrachlorophenyl, 2(chlorophenyl)ethyl, p-chlorobenzyl and 2(bromophenyl)propyl; and alkenyl radicals such as vinyl, allyl, hexenyl, butenyl, 3-octenyl, 4,9-octadecadienyl, 4-nonenyl, cyclohexenyl, tricyclo[$3.2.1.1^{3,8}$b]-5-nonenyl and dispiro[4.1.4.2]1-tridecenyl.

The diorganosiloxane units can be illustrated by dimethylsiloxane, diphenylsiloxane, methylphenylsiloxane, diethylsiloxane, ethylmethylsiloxane, methyl-3,3,3-trifluoropropylsiloxane, methylvinylsiloxane, cyclohexylmethylsiloxane and the like. It is understood that the polyorganosiloxane can be composed of more than one type of diorganosiloxane unit.

The polyorganosiloxanes can be endblocked with hydroxyl radicals or triorganosiloxy units such as trimethylsiloxy, dimethylphenylsiloxy, methylphenylvinylsiloxy, dimethylvinylsiloxy, dimethyl-3,3,3-trifluoropropylsiloxy and the like.

The polyorganosiloxanes can range in molecular weight from 162 to greater than 5,000,000. The polyorganosiloxanes can thus be thin fluids to gum-like materials.

The copolymer in the present invention consists of at least two segments where one segment is an organic vinylic polymer segment composed of monomeric vinylic compound residues derived from the same polymerizable vinyl containing organic monomers defined above for the organic vinylic thermoplastics and the other segment is a polyorganosiloxane segment composed of the siloxane units defined above for the polyorganosiloxane. The copolymer can be a block copolymer or a graft copolymer. The block copolymers consist of at least one organic vinylic polymer segment and at least one polyorganosiloxane segment where the two segments form the copolymer main chain. The block copolymers can contain more than one organic vinylic polymer segment and more than one polyorganosiloxane segment where the organic vinylic polymer segments alternate with the polyorganosiloxane segments in the copolymer main chain. The graft copolymer is composed of either an organic vinylic polymer segment as the main polymer chain with at least one polyorganosiloxane segment attached thereto in a pendent manner or a polyorganosiloxane segment as the main polymer chain with at least one organic vinylic polymer segment attached thereto in a pendent manner. These types of block copolymers and graft copolymers are known in the art.

The copolymers contain from 5 to 95 weight percent polyorganosiloxane segments and 5 to 95 weight percent organic vinylic polymer segments.

Block copolymers in the present invention can be prepared by polymerizing one or more of the above defined vinyl containing organic monomers with an organolithium compound in a solvent solution. The amount of organolithium compound used per amount of vinyl containing organic monomer will determine the size of the organic block. The smaller the amount of organolithium per given amount of vinyl containing organic monomer, (hereinafter referred to as vinylic monomer), the greater the number of polymerized vinylic monomer units in the resulting polymer. The reaction between the organolithium compound and the vinylic monomer should be carried out under conditions free from contaminations such as water, air, oxygen, inhibitors, acidic impurities, greases and the like. The mixture of the vinyl monomer and the organolithium in solvent solution are maintained at a temperature below the reflux temperature of the mixture and the freezing point of the mixture until the vinylic monomer has polymerized. The reaction product from the reaction of the organolithium compound and the vinylic monomer is a lithium terminated polymer of the following formula R—$(X)_x$—Li where X is the vinylic monomer residue and $x$ is the number of vinylic monomer units present in the polymer. Other than organolithium compounds other lithium compounds including elemental lithium can be used for the polymerization. Furthermore, if the lithium compound contains two lithium atoms, such as dilithiostilbene, the polymer would be Li—$(X)_y$—stilbene—$(X)_z$—Li where X is defined above and $y$ and $z$ are the number of vinylic monomer residue units.

To the lithium terminated polymer solution, hexaorganocyclotrisiloxane in solvent solution is added in an amount sufficient to provide at least one hexaorganocyclotrisiloxane molecule per each lithium end. The addition should be carried out so that there is no exposure of previously stated impurities. The resulting product would be, for the most part, a polymer of the formula $R-(X)_x-(R'_2SiO)_aLi$ or $Li-(OSiR'_2)_b(X)_y-Y-(X)_z(R'_2SiO)_c-Li$ where R, X, $x$, $y$ and $z$ are defined above and R' is the organic radical as defined above, Y is a divalent organic radical derived from the di-lithium compound and $a$, $b$ and $c$ are each from 1 to 3 inclusive. The reaction is held at a temperature between $-50°$ C. and no greater than the reflux temperature of the mixture. After sufficient time has elapsed, which is at least 30 minutes to 4 hours and which is recognizable by the disappearance of the color characteristic for lithium ended organic polymers, additional hexaorganocyclotrisiloxane in solvent solution and a polymerization promoter preferably in an amount of at least one weight percent based on the weight of the mixture is added to the lithium ended silicon-containing copolymer. Hexaorganocyclotrisiloxane is added in an amount necessary to provide the desired siloxane block size. The reaction mixture is preferably heated to reflux for 3 to 4 hours to increase the reaction rate. The reaction, however, can be carried out between $-50°$ C. and the reflux temperature of the mixture for at least 30 minutes or greater. The resulting product has a formula $R-(X)_x-(R'_2SiO)_n-Li$ or $Li(OSiR')_m-(X)_y-Y-(X)_z-(R'_2SiO)_p-Li$ where R, R', X, Y, $x$, $y$ and $z$ are defined above and $n$, $m$ and $p$ represent the number of diorganosiloxane units in the polyorganosiloxane segment of the copolymer. This block copolymer is then terminated by adding acetic acid to give a hydroxyl ended block copolymer or a triorganochlorosilane can be added to give a triorganosiloxy ended block copolymer or a diorganodichlorosilane can be added to couple the block copolymer molecules together and increase the molecular weight.

The lithium compounds for use in the preparation of the block copolymers described above include monolithium organic compounds such as ethyllithium, methyllithium, n-propyllithium, isopropyllithium, n-butyllithium, n-hexyllithium, octadecyllithium, $CH_3(CH_2)_sLi$, naphthyllithium, anthracyllithium, benzyllithium, phenyllithium, tolyllithium, xylyllithium, n-decyllithium, cyclohexyllithium, 4-butylphenyllithium, 4-cyclohexylbutyllithium, 4-phenylbutyllithium and octyllithium, and dilithium organic compounds such as dilithiostilbene, 1,4-dilithiobenzene, 1,5-dilithiopentane, 1,5-dilithionaphthalene, and 1,2-dilithio-1,3,3-triphenylpropane.

The vinylic monomers and the organic solvents should be washed, dried and/or distilled prior to use to remove any impurities such as water, inhibitors and the like. Suitable organic solvents include the hydrocarbon solvents which are solvents for the vinylic monomers, such as cyclohexane, toluene, benzene, n-hexane, mineral spirits, methylcyclohexane, xylene, n-butane, n-heptane, isooctane and cyclopentane.

The amount of the organolithium compound used can be readily approximated by dividing the weight of the vinylic monomer to be used by the molecular weight of the organic block desired. The results provide the number of moles of organolithium compound which is to be used. Since the reaction goes to almost 100 percent conversion and if the undesirable impurities have been carefully removed, the number average molecular weight obtained will be very close to the desired molecular weight used in determining the number of moles or organolithium compound to be used. It is to be understood that some combinations of organolithium compounds and vinylic monomers as well as certain conditions will deviate somewhat in the results from those calculated, since the percent conversion can vary. It is also to be understood that mixtures of the vinylic monomers can be polymerized or one vinylic monomer can be polymerized and then another vinylic monomer can be added and polymerized.

The organic solvent for the solution of the hexaorganocyclotrisiloxane can be any of those stated above for use during the polymerization of the vinylic monomer. The polymerization promoter can be, for example, dimethylsulfoxide, tetrahydrofuran and bis(2-methoxyethyl)ether.

The graft copolymers for this invention can be made in a number of ways known to the art. The graft copolymers can be made and then used in the method of blending defined herein or the graft copolymer can be made "in-situ". The in situ method is the most convenient method. This in situ method is carried out by including in a mixture of vinylic monomer and polyorganosiloxane, a polyorganosiloxane which contains groups reactive with the free radicals of the polymerizing system. Illustrative of the reactive groups are vinyl bonded to silicon or 3-mercaptopropyl bonded to silicon. The polyorganosiloxanes containing the free radical reactive groups can be illustrated by a polydiorganosiloxane composed of dimethylsiloxane units and methylvinylsiloxane units, a polydiorganosiloxane containing $HSCH_2CH_2CH_2(CH_3)_2SiO_{0.5}$ terminating units on a polydimethylsiloxane.

The vinylic monomers, polyorganosiloxane and polyorganosiloxane having free radical reactive groups are mixed with a free radical initiator, such as a peroxide such as benzoyl peroxide in a homogeneous solution. This resulting solution is then added to a solution of a suspending agent and water. The mixture is then agitated sufficiently to disperse the organic solution in droplets in the aqueous solution. The dispersed mixture is then heated to a temperature to polymerize the vinylic monomer and after sufficient time has lapsed and the vinylic monomer is polymerized, the product is recovered by removing the water and any unreacted vinylic monomer. The product is preferably recovered by distilling the unreacted vinylic monomer from the mixture followed by filtration of the product in the form of solid beads. The resulting product is a homogeneous blend of organic vinylic thermoplastic, polyorganosiloxane and a graft copolymer of a polymerized vinylic monomer and polyorganosiloxane containing the free radical reactive group. The procedure is similar to the well known methods used to polymerize vinylic monomers except that polyorganosiloxane and polyorganosiloxane containing the free radical reactive groups are present. Of course, other procedures such as bulk or emulsion polymerization may also be used.

The method of the present invention provides a homogeneous blend of an organic vinylic thermoplastic and a polyorganosiloxane by combining with these two incompatible materials a block copolymer or a graft copolymer where these copolymers are defined above.

The particular copolymer to be combined with any specified organic vinylic thermoplastic and polyorganosiloxane is such that the organic vinylic polymer segment of the copolymer has essentially the same molecular composition as that of the organic vinylic thermoplastic and the polyorganosiloxane segment has essentially the same molecular composition as the polyorganosiloxane. By the term "essentially" it is to be understood that the molecular compositions need not be identical, but that they are enough alike that if the organic vinylic polymer segment were a homopolymer it would be completely miscible with the organic vinylic thermoplastic and similarly with respect to the polyorganosiloxane segment and polyorganosiloxane. For example, if the organic vinylic thermoplastic is polystyrene and the polyorganosiloxane is polydimethylsiloxane, the block copolymer or the graft copolymer is composed of polystyrene segments and polydimethylsiloxane segments. The polystyrene segment could also contain some other polymerized vinylic monomer unit such as alpha-methylstyrene and the polydimethylsiloxane segment could also contain some methylvinylsiloxane segments, for example.

The blends can be made by mixing the preformed polymers or the blends can be made by mixing the polyorganosiloxane, polyorganosiloxane containing a free radical reactive group and vinylic monomer and then polymerizing the vinylic monomer and at the same time forming a graft copolymer in situ. The polyorganosiloxane is present in an amount of from 0.001 to 50 weight percent inclusive based on the combined weight of the organic vinylic thermoplastic and polyorganosiloxane, preferably from 0.01 to 30 weight percent inclusive. The copolymer is present in an amount of from 0.0001 to 50 weight percent inclusive based on the combined weight of the organic vinylic thermoplastic and the polyorganosiloxane, preferably from 0.01 to 10 weight percent inclusive. The organic vinylic thermoplastic is present in an amount of at least 40 weight percent based on the total weight of the blend.

The blends can thus be prepared in a number of ways. The organic vinylic thermoplastic, the polyorganosiloxane and the block copolymer or graft copolymer can be mechanically mixed, particularly where the organic vinylic thermoplastic is softened or in the molten state. Blends can also be prepared by mixing the three components in a solvent and then removing the solvent or solvent solutions of each of the components can be prepared and then the solvent solutions can be mixed and the solvent then removed to provide a blend. Another way of making the blends is to mix the polyorganosiloxane and the block copolymer or graft copolymer with vinylic monomer and thereafter polymerize the vinylic monomer. Still another way is the in situ formation of the graft copolymer defined above.

The organic vinylic thermoplastics in the present invention are glassy thermoplastics which form a continuous phase. The polyorganosiloxane is homogeneously dispersed throughout this continuous phase by the action of the copolymer. The organic vinylic thermoplastic is a solid at ambient temperatures and at the "use" temperature.

The blends prepared by the method of the present invention have not been previously prepared with as high a degree of uniformity of dispersed polyorganosiloxane in the final product, as prepared by the present method. Previously, polyorganosiloxane mixed with organic vinylic thermoplastics in amounts greater than a fraction of one percent resulted in a non-uniform dispersion of the polyorganosiloxane in the organic vinylic thermoplastic. Prior art methods which appeared to provide uniform or homogeneous dispersions of polyorganosiloxane was present in amounts greater than a fraction of one percent showed non-uniform dispersion of the polyorganosiloxane in the organic vinylic thermoplastic. Since larger amounts than a fraction of one percent polyorganosiloxane in the organic vinylic thermoplastic are desirable, no good economical and acceptable method of making highly uniform dispersions of polyorganosiloxane in organic vinylic thermoplastic has previously been known prior to the present invention.

The resulting blends provide the organic vinylic thermoplastic with a greatly improved moldability because of the improved flow characteristics and improved release from the mold. The blends also have improved toughness, impact strength and tensile strength. The blends have greatly reduced melt viscosity and improved lubricity.

The present invention also relates to a method of blending the blends described above with commercial thermoplastics to achieve a uniform distribution of the polyorganosiloxane. The blends described herein are solids and can be used as an additive for commercial thermoplastics. Solid additives are more readily used as additives and thus are much more desirable than liquid additives. When used as an additive in blending with commercial thermoplastics, the polyorganosiloxane content of the blend is sufficiently high in the blend so that after mixing a small amount of the blend with the commercial thermoplastics, the thermoplastic will have the improved characteristics stated herein. The amount of polyorganosiloxane in the blends used where the blends are used as additives to commercial thermoplastics, are preferably from 10 to 50 weight percent based on the combined weight of the polyorganosiloxane and the organic vinylic thermoplastic in the additive blend.

The blends of this invention have general characteristics of organic vinylic thermoplastics, however, they have the added advantages of improved tensile strengths, toughness, handling properties and lubricity. The uses of the blends can be any of those of the present commercial thermoplastics, in addition to new applications where the increased tensile strength, toughness, handling properties, impact strength and lubricity are presently insufficient to allow the thermoplastic to function satisfactorily.

The following examples are presented for illustrative purposes only and should not be construed as limiting the present invention which is properly delineated in the claims.

EXAMPLE 1

Block copolymers were prepared as follows. The quantities and results of this example are tabulated in Table I.

Freshly distilled styrene, which was washed with dilute sodium hydroxide to remove any inhibitors are dried before distillation, in cyclohexane was refluxed for 15 minutes under a slow purge of pure nitrogen. The styrene was further dried by refluxing the solution over calcium hydride for 30 minutes. The styrene solution dried in this manner was then transferred to a reactor, which had been previously purged with pure nitrogen and under a slight nitrogen pressure without exposure to the atmosphere. The polymerization of the styrene is initiated by adding a 1.6 molar solution of butyllithium in hexane. The reactor was cooled during the initial stages of the polymerization. After 3 to 4 hours at room temperature, the polymerization of styrene was complete.

A solution of $\{(CH_3)_2SiO\}_3$ in cyclohexane was refluxed for 15 minutes under a slow nitrogen purge and then dried by refluxing over calcium hydride for 30 minutes. A portion of the dried solution of $\{(CH_3)_2SiO\}_3$ was then added to the reactor containing the polymerized styrene without exposure of either solution to the atmosphere. After about 1 hour of agitation at 50° to 60° C. the orangish color characteristic of the lithium ended polystyrene completely disappeared. The remaining dried solution of $\{(CH_3)_2SiO\}_3$ was added and then tetrahydrofuran was added. The resulting reaction mixture was then agitated and refluxed for 4 hours, at which time the original cloudy solution cleared. The resulting product was then neutralized with 1.0 ml. of dimethylvinylchlorosilane followed by 1.0 g. of sodium bicarbonate to provide a dimethylvinylsiloxy terminated block copolymer or with 1.0 ml. of acetic acid followed by 1.0 g. of sodium bicarbonate to give a silanol terminated block copolymer. The product solutions were washed with water and precipitated with methanol. The precipitates were washed several times with methanol and then the residual solvent was removed by heating at 50° C. and 0.1 mm of Hg for 19 hours. The product was a block copolymer represented by the formula

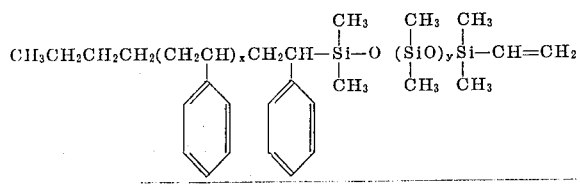

in the case of the dimethylvinylsiloxy terminated block copolymer and

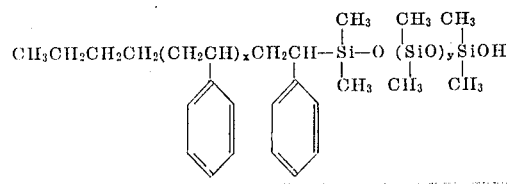

in the case of the silanol terminated block copolymer. The values of $x$ and $y$ are dependent upon the molecular weights and the weight percentages of each block.

The procedure was varied in Run No. 12 as follows: The mixture after the addition of the dimethylsulfoxide was refluxed for 1 hour and then allowed to stand for 48 hours before neutralizing with 1.0 g. of dry ice. The block copolymer was precipitated by distilling 200 ml. of the solvent and adding methanol. The infrared analysis was consistent with the structure and the block copolymer formed a single solution phase in carbon tetrachloride whereas a mixture of polystyrene and polydimethylsiloxane formed a two phase system in carbon tetrachloride.

TABLE I

| Run No. | ml. Cyclohexane Styrene, dissolved grams | Styrene grams | Moles n-butyl lithium | Total $\{(CH_3)_2SiO\}_3$ grams | ml. Cyclohexane $\{(CH_3)_2SiO\}_3$ dissolved in | ml. Cyclohexane $\{(CH_3)_2SiO\}_3$ solution, first addition | ml. Tetrahydrofuran |
|---|---|---|---|---|---|---|---|
| 1 | 140 | 466 | 0.0280 | 60 | 159 | 50 | 120 |
| 2 | 140 | 466 | 0.0070 | 60 | 159 | 60 | 120 |
| 3 | 104 | 400 | 0.0054 | 166.6 | 400 | 50 | 150 |
| 4 | 90 | 288 | 0.0030 | 67 | 192 | 55 | 120 |
| 5 | 90 | 288 | 0.0030 | 67 | 192 | 40 | 120 |
| 6 | 90 | 288 | 0.0030 | 62 | 192 | 55 | 120 |
| 7 | 80 | 275 | 0.0026 | 120 | 350 | 100 | 120 |
| 8 | 80 | 275 | 0.0026 | 120 | 350 | 100 | 120 |
| 9 | 20 | 95 | 0.00064 | 30 | 95 | 50 | 60 |
| 10 | 80 | 400* | 0.0010 | 168 | 672* | 100 | 20** |
| 11 | 140 | 400 | 0.00133 | 60 | 200 | 40 | 10 |
| 12 | 69.4 | 350 | 0.0064 | 50 | 775 | 10 | 2**** |
| 13 | 70 | 350 | 0.0014 | 130 | 950 | 100 | 120 |
| 14 | 50 | 200*| 0.0015 | 127 | 804* | 50 | 25** |
| 15 | 60 | 300*| 0.0014 | 130 | 656* | 100 | 25** |

| Run No. | Yield of block copolymer recovered, % | No. average molecular wt. of block copolymer*** | Terminating group | Weight % of siloxane block | Approximate value of $x$ | $y$ |
|---|---|---|---|---|---|---|
| 1 | 96.0 | 7,060 | $-Si(CH_3)_2CH=CH_2$ | 28.4 | 25 | 47 |
| 2 | 84.0 | 30,600 | $-Si(CH_3)_2CH=CH_2$ | 29.1 | 118 | 207 |
| 3 | 84.0 | 48,800 | $-Si(CH_3)_2OH$ | 61.6 | 404 | 179 |
| 4 | 78.0 | 47,600 | $-Si(CH_3)_2CH=CH_2$ | 32.0 | 204 | 310 |
| 5 | 80.0 | 41,400 | $-Si(CH_3)_2CH=CH_2$ | 33.0 | 182 | 265 |
| 6 | 94.0 | 65,400 | $-Si(CH_3)_2OH$ | 36.9 | 324 | 395 |
| 7 | 91.0 | 80,000 | $-Si(CH_3)_2OH$ | 58.7 | 632 | 316 |
| 8 | 91.0 | 80,000 | $-Si(CH_3)_2CH=CH_2$ | 58.7 | 632 | 316 |
| 9 | 82.8 | 72,600 | $-Si(CH_3)_2OH$ | — | — | — |
| 10 | 80.0 | 170,000 | $-Si(CH_3)_2CH=CH_2$ | 53.6 | 1229 | 757 |
| 11 | 84.0 | 129,000 | $-Si(CH_3)_2CH \quad CH_2$ | 27.4 | 475 | 899 |
| 12 | — | — | $-Si(CH_3)_2OH$ | — | — | — |
| 13 | — | 44,200 | $-Si(CH_3)_2CH=CH_2$ | 26.8 | 310 | 158 |
| 14 | — | 140,227 | $-Si(CH_3)_2CH=CH_2$ | 58.2 | 562 | 1101 |
| 15 | 82.0 | 169,300 | $-Si(CH_3)_2CH=CH_2$***** | 60 | 651 | 1370 |

*Benzene used in place of the cyclohexane.
**Bis-(2-methoxyethyl)ether used in place of the tetrahydrofuran.
***Determined by membrane osmometry.
****Dimethylsulfoxide used in place of the tetrahydrofuran.

***** 5 g. $(CH_3SiO)_3$ added after $\{(CH_3)_2SiO\}_3$ was 85% consumed, with $CH=CH_2$ group.

EXAMPLE 2

A. A solution of 11 g. of sodium carboxymethylcellulose (suspending agent) in 3,140 ml. of water was prepared. To this solution, a mixture of 919 g. of styrene and 2.35 g. of benzoyl peroxide is added forming a suspension by stirring. The polymerization was carried out by heating under a nitrogen atmosphere at 80° to 85° C. for 9 hours. At this point the conversion of the styrene to polystyrene was greater than 95 percent. The unreacted styrene monomer was distilled from the system and the polystyrene was recovered in bead form. The polystyrene was washed and dried. The resulting polystyrene had a number average molecular weight of 100,000 and a ratio of weight average molecular weight ($\overline{M}_w$) to number average molecular weight ($\overline{M}_n$) of 2.9.

B. The procedure of A. above was repeated, except there was also present 2.21 g. of the block copolymer prepared in Example 1, Run No. 10 and 1.47 g. of polydimethylsiloxane having a number average molecular weight of 100,000 and a ratio of $\overline{M}_w/\overline{M}_n$ of 2.54. The resulting blend was a uniform mixture of polystyrene continuum in which polydimethylsiloxane and the block copolymer were homogeneously dispersed. The blend had 0.16 weight percent polydimethylsiloxane and 0.24 weight percent block copolymer both based on the combined weight of the polydimethylsiloxane and the polystyrene. The polystyrene had a number average molecular weight of 122,000 and a ratio of $\overline{M}_w/\overline{M}_n$ of 2.8.

C. The procedure of B. above was repeated except the amount of block copolymer was 1.47 g. and the amount of polydimethylsiloxane was 2.21 g. The resulting blend was a uniform mixture of polystyrene continuum in which polydimethylsiloxane and the block copolymer were homogeneously dispersed. The blend had 0.24 weight percent polydimethylsiloxane and 0.16 weight percent block copolymer both based on the combined weight of the polydimethylsiloxane and the polystyrene. The polystyrene had a $\overline{M}_n$ of 98,000 and a ratio of $\overline{M}_w/\overline{M}_n$ of 2.9.

EXAMPLE 3

A. A block copolymer was prepared as described by the procedure of Example 1 where 180 g. of styrene, 270 g. of hexamethylcyclotrisiloxane, 2,600 g. of benzene, 1.5 × 10⁻³ ml. of n-butyl lithium, 100 ml. of dimethyl ether of diethylene glycol and 2 ml. of acetic acid which was used to terminate the reaction, was used. The block copolymer had a $M_n$ of 297,000 and 55.4 weight percent polystyrene block and 44.6 weight percent polydimethylsiloxane block.

B. A blend was prepared as described in Example 2, B. except 9.19 g. of the block copolymer of A. above and 36.76 g. of a polydimethylsiloxane having a number average molecular weight of 84,000 were used instead of the block copolymer and polydimethylsiloxane described in Example 2, B. The resulting blend was a uniform mixture of polystyrene continuum in which polydimethylsiloxane and the block copolymer were homogeneously dispersed. The blend had 3.85 weight percent polydimethylsiloxane and 0.96 weight percent of the block copolymer both based on the combined weight of the polydimethylsiloxane and the polystyrene. For comparative purposes, the procedure for preparing the blend was repeated except the block copolymer was not used. The resulting mixture was not a uniform blend, however, it had 3.85 weight percent polydimethylsiloxane. The melt index at 190° C. was determined on a commercial melt indexer. The polystyrene prepared in Example 2, A. had a melt index at 190° C. of 0.120 g./min. The above mixture containing 3.85 weight percent polydimethylsiloxane had a melt index at 190° C. of 0.088 g./min. and the above blend containing both polydimethylsiloxane and the block copolymer had a melt index of 0.209 g./min.

EXAMPLE 4

The toughness of the blends were determined by measuring the tensile strength and elongation by ASTM-D-412-66 with a pull of 0.5 inch per minute at room temperature. The toughness of the blends were as shown in Table II as the "toughness index" which is a numerical value to show relative toughness of a material. The toughness index was calculated as follows:

Toughness Index = (Tensile in p.s.i. at yield + Tensile in p.s.i. at break) (Elongation at break in percent) 2.

Additional details for the toughness index can be found in "Testing of Polymers" by John V. Schmitz, Interscience Publishers, New York, In those cases where no tensile or elongation are shown at yield, the yield point and the break point are the same.

The toughness index was determined on the following materials:
  A. The polystyrene of Example 2, A.
  B. The mixture of Example 3, B. containing polystyrene and 3.85 weight percent polydimethylsiloxane.
  C. The blend of Example 3, B. containing both the block copolymers and polydimethylsiloxane.
  D. A blend prepared as described in Example 2, B. containing a block copolymer having a $\overline{M}_n$ of 77,800 and 38 weight percent polydimethylsiloxane block and 62 weight percent polystyrene block and polydimethylsiloxane having a $\overline{M}_n$ of 84,000. The blend had 3.98 weight percent polydimethylsiloxane and 0.826 weight percent of the block copolymer both based on the combined weight of the polydimethylsiloxane and polystyrene.

TABLE II

| Material | Tensile in p.s.i. at yield | Elongation, % at yield | Tensile in p.s.i. at break | Elongation, % at break | Toughness Index |
|---|---|---|---|---|---|
| A. | — | — | 6,250 | 1.7 | 5,312 |
| B. | 6,030 | 2.8 | 5,110 | 8.8 | 49,016 |
| C. | 5,340 | 2.1 | 4,360 | 10.0 | 48,500 |
| D. | 5,430 | 1.8 | 4,040 | 10.9 | 51,612 |

EXAMPLE 5

A blend was prepared as described in Example 2, B. except 9.19 g. of the block copolymer of Example 3, A. and 36.76 g. of a polydimethylsiloxane having a $\overline{M}_n$ of 520,000 were used. The resulting blend was a uniform dispersion of 3.85 weight percent polydimethylsiloxane in polystyrene and 0.96 weight percent block copolymer both based on the combined weight of the polydimethylsiloxane and polystyrene. This blend was compression molded into a strip 0.25 inch wide and 0.05 inch thick. The molded strip was placed in the path of a swinging hammer. The impact strength was evaluated by observing the change in the arc of swing in arbitrary units after the hammer impacted the mounted specimen. The impact strength was 1.8 times greater for this blend than for a similarly prepared and tested pure polystyrene.

EXAMPLE 6

A blend prepared as described in Example 2, B. was prepared except the block copolymer used was the block copolymer described in Example 3, A. and the polydiorganosiloxane was a trimethylsiloxy endblocked polydimethylsiloxane fluid having a molecular weight of 384. The resulting blend had 8.25 weight percent of the polydimethylsiloxane and 0.92 weight percent of the block copolymer both based on the combined weight of the polydimethylsiloxane and polystyrene. The melt index at 190° C. for polystyrene was 0.123 g./min. whereas the melt index at 190° C. for the blend was 3.13 g./min.

EXAMPLE 7

The blend as described in Example 6 was blended with a commercial polystyrene and a commercial high impact polystyrene. The melt index at 190° C. was determined at different levels. The results were as shown in Table III, also shown are the resulting percentages of polydimethylsiloxane based on the weight of the polystyrene and block copolymer based on the weight of the polydimethylsiloxane

TABLE III

| Weight % of blend of Ex. 6 | Weight % Polydimethyl- siloxane Total Composition | Wt. % block copolymer in total Composition | melt index at 190°C., g./min. |
|---|---|---|---|
| Commercial Polystyrene | | | |
| 0.0 | 0.0 | 0.0 | 0.115 |
| 1.0 | 0.090 | 0.01 | 0.13 |
| 10.0 | 0.909 | 0.101 | 0.19 |
| 25.0 | 2.309 | 0.256 | 0.25 |
| 50.0 | 4.738 | 0.526 | 1.19 |
| High Impact Polystyrene | | | |
| 0.0 | 0.0 | 0.0 | 0.07 |
| 0.25 | 0.0225 | 0.0025 | 0.11 |

EXAMPLE 8

A. A mixture of 919 g. of styrene and 138 g. of a trimethylsiloxy endblocked polydimethylsiloxane having a viscosity of 89 cs. at 25° C. and an average molecular weight of about 4,800 were heated to 100° to 115° C. for 2 hours with agitation to provide a polymerization of the styrene to about 25–35 percent conversion. To this partially polymerized mixture was added an aqueous solution of 17.5 g. of sodium carboxymethylcellulose and 1.9 g. of benzoyl peroxide in 3,100 ml. of water. The resulting aqueous suspension was heated at 80° C. for 18 hours. The resulting polymer was recovered as described in Example 2, A.

B. The above procedure of A. was repeated except 9.2 g. of a polydiorganosiloxane having 78 mol percent dimethylsiloxane units and 22 mol percent methylvinylsiloxane units and endblocked with dimethylvinylsiloxane and having an average molecular weight of about 43,500 and 129 g. of the polydimethylsiloxane described in A. above were used in place of the 138 g. of polydimethylsiloxane.

C. The procedure of Example 3, B. was repeated except 128.66 g. of the polydimethylsiloxane described in A. above was used instead of the 36.76 g. of the 84,000 molecular weight polydimethylsiloxane of Example 3, B.

D. The procedure of A. above was repeated using 128.66 g. of the polydimethylsiloxane described therein and 9.19 g. of the block copolymer described in Example 3, A.

E. Polystyrene as prepared as described in Example 2, A.

F. The melt index at 190° C. was determined for the polystyrene and mixtures prepared in A. through E. above and the results were as shown below in Table IV.

TABLE IV

| Polystyrene | Melt Index, g./min. |
|---|---|
| A. | 0.23 |
| B. | 3.56 |
| C. | 0.36 |
| D. | 0.75 |
| E. | 0.17 |

EXAMPLE 9

Styrene and acrylonitrile monomers were freed from inhibitors by passing them through beds of alumina and silica gel respectively. The following ingredients were mixed until a homogeneous mixture was obtained: 643.3 g. of styrene, 275.5 g. of acrylonitrile, 91.9 g. of a trimethylsiloxy endblocked polydimethylsiloxane having a viscosity of 89 cs. at 25° C., 45.9 g. of a dimethylvinylsiloxy endblocked polydiorganosiloxane having 78 mol percent dimethylsiloxane units and 22 mol percent methylvinylsiloxane units and having an average molecular weight of about 43,500, and 1.9 g. of benzoyl peroxide. This mixture was added to a solution of 11.5 g. of sodium carboxymethylcellulose in 3,100 ml. of distilled water. The resulting mixture was stirred until the organic phase was dispersed in droplet form. This dispersion was heated to 78° C. and held for 21 hours. The temperature was then raised to 100° C. and 25 G. of unreacted acrylonitrile was recovered. The resulting blend of polymerized material was separated from the aqueous solution, washed with water and then dried. The resulting blend was a styrene-acrylonitrile copolymer having dispersed therein a polydimethylsiloxane and a graft copolymer of the dimethylvinylsiloxy endblocked polydiorganosiloxane with styrene-acrylonitrile copolymer grafted thereon. The blend had a melt index at 190.2° C. under a load of 2,100 g. of 5.6 g./min.

The above procedure was repeated without the polydimethylsiloxane and the dimethylvinylsiloxy endblocked polydiorganosiloxane. The resulting styrene-acrylonitrile copolymer had a similar molecular weight as determined by gas-liquid-phase chromatography. The melt index at 190° C. under a load of 2,100 g. for this copolymer was 0.00024 g./min.

EXAMPLE 10

Methylmethacrylate was freed from inhibitor by washing with a 5 percent aqueous solution of potassium hydroxide. The following ingredients were mixed until a homogeneous mixture was obtained: 200 g. of methylmethacrylate, 10 g. of $HSCH_2(CH_3)_2SiO$ $\{(CH_3)_2SiO\}_nSi(CH_3)_2CH_2SH$ where $n$ has an average value of 500, 20 g. of a trimethylsiloxy endblocked polydimethylsiloxane having a viscosity of 89 cs. at 25° C. and 1.9 g. of benzoyl peroxide. This mixture was added to an aqueous solution of 60 g. of sodium carboxymethylcullulose, 0.2 g. of monosodium phosphate and 3.4 g. of disodium phosphate in 600 ml. of distilled water. The resulting mixture was stirred until the organic phase was dispersed in droplet form. This reaction mixture was then heated to 80° C. ± 2° C. for 45 minutes as which time the polymerization was complete. A blend was isolated as opaque beads after washing in the amount of 195 g. The blend was methylmethacrylate polymer having homogeneously dispersed therein, polydimethylsiloxane and a graft copolymer of $HSCH_2(CH_3)_2SiO\{(CH_3)_2SiO\}_nSi(CH_3)_3$ $CH_2SH$ on methylmethacrylate polymer. The melt index at 220° C. of this blend under a load of 5,333 g. was 0.056 g./min.

The above polymerization without the polysiloxanes was repeated yielding 170 g. of a methylmethacrylate polymer having a similar molecular weight as the methylmethacrylate polymer of the first polymerization as determined by gas-liquid-phase chromatography. The resulting methylmethacrylate polymer could not be extruded from the melt flow plastometer at 220° C. under a load of 5,333 g.

EXAMPLE 11

A mixture of 700 ml. of distilled water, 30 g. of trimethylsiloxy endblocked polydimethylsiloxane having a viscosity of 89 cs. at 25° C., 15 g. of $HSCH_2(CH_3)_2$ $SiO \{(CH_3)_2SiO\}_nSi(CH_3)_2CH_2SH$ where $n$ has an average value of 500, 1.0 g. of benzoyl peroxide and 2.0 g. of sodium carboxymethylcellulose was charged into a 2 liter high pressure autoclave having suitable stirring means. The system was flushed with nitrogen and cooled to −70° C. and evacuated to a pressure of about 1 mm of Hg. Through a bed of alumina to remove the inhibitor, 300 g. of vinyl chloride was distilled into the autoclave. The autoclave was pressurized to 100 p.s.i. with nitrogen and heated to 50° C. ± 2° C. under vigorous agitation for 24 hours. The pressure passed through a maximum of 240 p.s.i. The resulting product was washed and dried to provided 300 g. of off-white solid. The product was a blend of a polyvinyl chloride having dispersed therein polydimethylsiloxane and a graft copolymer of $HSCH_2(CH_3C2SiO\{(CH_3)_2SiO\}_nSi(CH_3)_2CH_2SH$ on polyvinyl chloride. The coefficient of static friction between steel and a film of the blend was 0.2.

The above polymerization without the polysiloxanes was repeated providing a polyvinyl chloride in the amount of 290 g. The coefficient of static friction between steel and a film of the polyvinyl chloride was 0.3.

Films were cast from 7–8 weight percent solutions of (A) the polyvinyl chloride in tetrahydrofuran, (B) the blend and (C) a solution of 3.27 g. of the polyvinylchloride, 0.33 g. of the above polydimethylsiloxane and 0.16 g. of the above mercapto-terminated polysiloxane in 50 cc tetrahydrofuran. The tensile strength at break and the elongation at break were determined and found to be as shown below.

| Polymer System | Tensile Strength, p.s.i. | Elongation % |
|---|---|---|
| A | 1040 | 2.5 |
| B | 6640 | 7.0 |
| C | <100* | 1.0 |

*sample so weak and brittle that they cracked while being mounted in the test instrument.

EXAMPLE 12

The melt index at 190° C. was determined by preheating the following specimens for 20 minutes. The specimens were as shown below in Table V.

TABLE V

| Material | Melt Index, g./min. |
|---|---|
| 1. Commercial Polystyrene | 0.10 – 0.13 |
| 2. Polymer of Example 8, A. | 0.23 |
| 3. Blend of Example 8, B. | 5.91 |
| 4. Blend of Example 8, D. | 0.75 |

EXAMPLE 13

A dispersion of 2.0 g. of polystyrene having a molecular weight of 9,000, 2.5 g. of the block copolymer Example 3, A. and 20.5 g. of toluene was prepared by shaking overnight. To this, 0.5 g. of a trimethylsiloxy endblocked polydimethylsiloxane having a viscosity of 100 cs. at 25° C. was added and thoroughly mixed therein. A film was cast on a glass surface by evaporating the toluene to produce a glassy translucent film.

That which is claimed is:

1. A method of homogeneously blending a polyorganosiloxane in an organic vinylic thermoplastic comprising combining with the organic vinylic thermoplastic and polyorganosiloxane, a copolymer in an amount of from 0.0001 to 50 inclusive weight percent based on the weight of the combined weight of the polyorganosiloxane and the organic vinylic thermoplastic, said polyorganosiloxane being essentially a polymer of diorganosiloxane units linked by silicon-oxygen-silicon bonds wherein the organic radicals are selected from the group consisting of alkyl, halogenated alkyl, aryl, halogenated aryl and alkenyl radicals where each organic radical has from one to 18 inclusive carbon atoms, said polyorganosiloxane being terminated by a radical from the group consisting of triorganosiloxy units and hydroxyl radicals, said polyorganosiloxane being present in an amount of from 0.001 to 50 inclusive weight percent based on the combined weight of the organic vinylic thermoplastic and the polyorganosiloxane and said polyorganosiloxane being present in an amount of at least sixteen and two thirds weight percent based on the combined weight of the polyorganosiloxane and the copolymer, said copolymer consists essentially of at least one polyorganosiloxane segment and at least one organic vinylic polymer segment wherein the polyorganosiloxane segment is essentially the same molecular composition as the polyorganosiloxane and the organic vinylic polymer segment is essentially the same molecular composition as the organic vinylic thermoplastic, said copolymer having from 5 to 95 inclusive weight percent polyorganosiloxane segment and from 5 to 95 inclusive weight percent organic vinylic polymer segment and said organic vinylic thermoplastic being present in an amount of at least 40 weight percent based on the total weight of the composition whereby a blend is obtained which is a glassy thermoplastic at ambient temperature where the organic vinylic thermoplastic is the continuous phase.

2. The blend prepared in accordance with claim 1.

3. The method in accordance with claim 1 in which the copolymer is a block copolymer.

4. The method in accordance with claim 1 in which the copolymer is a graft copolymer.

5. The method in accordance with claim 3 in which the block copolymer consists essentially of at least one organic vinylic polymer segment selected from the group consisting of homopolymeric and copolymeric segments of styrene, alpha-methylstyrene, vinylchloride, methylmethacrylate and acrylonitrile and at least one polyorganosiloxane segment selected from the group consisting of homopolymer and copolymer segments of polymeric units of dimethylsiloxane, phenylmethylsiloxane, methylvinylsiloxane and methyl-3,3,3-trifluoropropylsiloxane.

6. The method in accordance with claim 4 in which the graft copolymer consists essentially of at least one organic vinylic polymer segment selected from the group consisting of homopolymeric and copolymeric segments of styrene, alpha-methylstyrene, vinylchloride, methylmethacrylate and acrylonitrile and at least one polyorganosiloxane segment selected from the group consisting of homopolymer and copolymer segments of polymeric units of dimethylsiloxane, phenylmethylsiloxane, methylvinylsiloxane and methyl-3,3,3-trifluoropropylsiloxane wherein the segments are bonded through sulfur or —$CH_2CH_2$—.

7. The method in accordance with claim 6 wherein the graft copolymer is prepared in situ by polymerizing a mixture of vinyl containing organic monomer selected from the group consisting of styrene, alpha-methylstyrene, vinylchloride, methylmethacrylate, and acrylonitrile, a polyorganosiloxane containing reactive silicon bonded groups selected from the group consisting of mercaptoorgano radicals and vinyl radicals and a polyorganosiloxane in the presence of a free radical initiator and thereby obtaining a blend.

* * * * *